(12) United States Patent
Kowalski et al.

(10) Patent No.: US 8,248,428 B2
(45) Date of Patent: Aug. 21, 2012

(54) PARALLEL COMPUTATION OF COMPUTATIONALLY EXPENSIVE PARAMETER CHANGES

(75) Inventors: Jeff Kowalski, Berkeley, CA (US); Mark Davis, Mill Valley, CA (US); Jose Madeira De Freitas Garcia, San Francisco, CA (US); Tovi Grossman, Toronto (CA); George Fitzmaurice, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 741 days.

(21) Appl. No.: 12/410,265

(22) Filed: Mar. 24, 2009

(65) Prior Publication Data
US 2010/0128061 A1     May 27, 2010

Related U.S. Application Data

(60) Provisional application No. 61/118,159, filed on Nov. 26, 2008.

(51) Int. Cl.
*G09G 5/00*     (2006.01)
(52) U.S. Cl. ......................... 345/581; 345/619
(58) Field of Classification Search .......................... None
See application file for complete search history.

(56) References Cited

U.S. PATENT DOCUMENTS 7,522,176 B2 *  4/2009  Tolle et al. .................... 345/619
8,018,470 B2 *  9/2011  Hsu ............................... 345/619

OTHER PUBLICATIONS

Björn et al. "Design as Exploration: Creating Interface Alternatives through Parallel Authoring and Runtime Tuning," In Proceedings of UIST 2008: ACM Symposium on User Interface Software and Technology. Monterey, CA, Oct. 2008.

Lunzer et al. "Subjunctive Interfaces: Extending Applications to Support Parallel Setup, Viewing and Control of Alternative Scenarios," ACM Transactions on Computer-Human Interaction, vol. 24, Issue 4, 2008, Jan. 2008.

* cited by examiner

*Primary Examiner* — Ryan R Yang
(74) *Attorney, Agent, or Firm* — Patterson & Sheridan, LLP (57) ABSTRACT

One embodiment of the invention sets forth a graphics application configured to generate previews of a graphics object when a configurable parameter is modified. A computation engine computes the result of the modified parameter value and determines a set of additional parameter values based on configurable meta-data. The computation engine then computes results of each additional parameter value. Each computed result specifies a different change in the characteristic of the graphics object. The computation engine transmits the computed results to a preview generator, also included in the graphics application. For each computed result, the preview generator generates a preview of the graphics object that incorporates the change in the characteristic of the graphics object. The previews are transmitted to a preview pane for display. The user may then select one of the previews, and the parameter value of the configurable parameter is modified based on the selected preview.

23 Claims, 7 Drawing Sheets

PARALLEL COMPUTATION OF COMPUTATIONALLY EXPENSIVE PARAMETER CHANGES

CROSS-REFERENCE TO RELATED APPLICATIONS

This application claims the priority benefit of Provisional U.S. Patent Application Ser. No. 61/118,159, filed Nov. 26, 2008, the subject matter of which is hereby incorporated by reference.

BACKGROUND OF THE INVENTION

1. Field of the Invention

The invention relates generally to the field of computer software and, more specifically, to parallel computation of computationally expensive parameter changes.

2. Description of the Related Art

A graphics software application offers users a tool to design and model graphics objects within a graphics scene. Each graphics object within a graphics scene is associated with one or more parameters having respective parameter values. For example, a graphics object representing a light source may be associated with a brightness parameter. The graphics software application provides user-interface (UI) elements that allow users to modify parameter values of the different parameters by manipulating the UI elements. Some examples of UI elements include sliders, dropdown boxes, and text boxes. For example, a user may modify a parameter value of a brightness parameter associated with a graphics object using a slider UI element.

Most graphics software applications provide real-time feedback to a user when a parameter associated with a graphics object is modified, i.e., the results of changing the parameter value associated with the parameter is displayed on a display device to the user in real-time. For example, in the case of modifying the brightness parameter associated with the graphics object representing the light source, the user may manipulate a slider UI element and simultaneously view the changing brightness of the graphics object. The real-time feedback provided by the manipulation of a UI element allows the user to more quickly achieve the desired results.

To provide the user with the benefits of providing real-time feedback when a UI element is manipulated, the graphics software application computes the results of a modified parameter value in real-time. However, some computations involve time-intensive operations and the graphics software application is not able to compute the results of the modified parameter value as the user manipulates the UI element. In such cases, the user waits for the results of the computation associated with the modified parameter value to be displayed, views the results of the modified parameter value, and then determines the necessary adjustments to the parameter value. Consequently, the user spends a significant amount of time waiting for the result of each iteration of modifying the parameter values to be computed.

As the foregoing illustrates, what is needed is an effective technique for viewing the results of computationally expensive modifications to parameter values associated with a graphics object and/or a graphics scene.

SUMMARY OF THE INVENTION

One embodiment of the invention sets forth a computer-implemented method for modifying a parameter value corresponding to a parameter associated with a graphics object included a graphics application. The method includes receiving a user input to modify of a first parameter value corresponding to a first parameter associated with the graphics object from a first value to a second value, and determining a set of additional parameter values corresponding to the first parameter based on the second value and meta-data associated with the graphics application. The method further includes generating a first version of the graphics object based on setting the first parameter value to the second value and generating one or more additional versions of the graphics object based on setting the first parameter value to each of the parameter values included in the set of additional parameter values. The method further includes displaying the first version of the graphics object and the one or more additional versions of the graphics object, receiving a user selection of either the first version of the graphics object or one additional versions of the graphics object, and rendering the graphics object so that the first parameter value equals the parameter value associated with the selected version of the graphics object.

One advantage of the disclosed method is that a user is able to view the results of the set of additional parameter values of a parameter along with the result of a user-selected modified parameter value.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
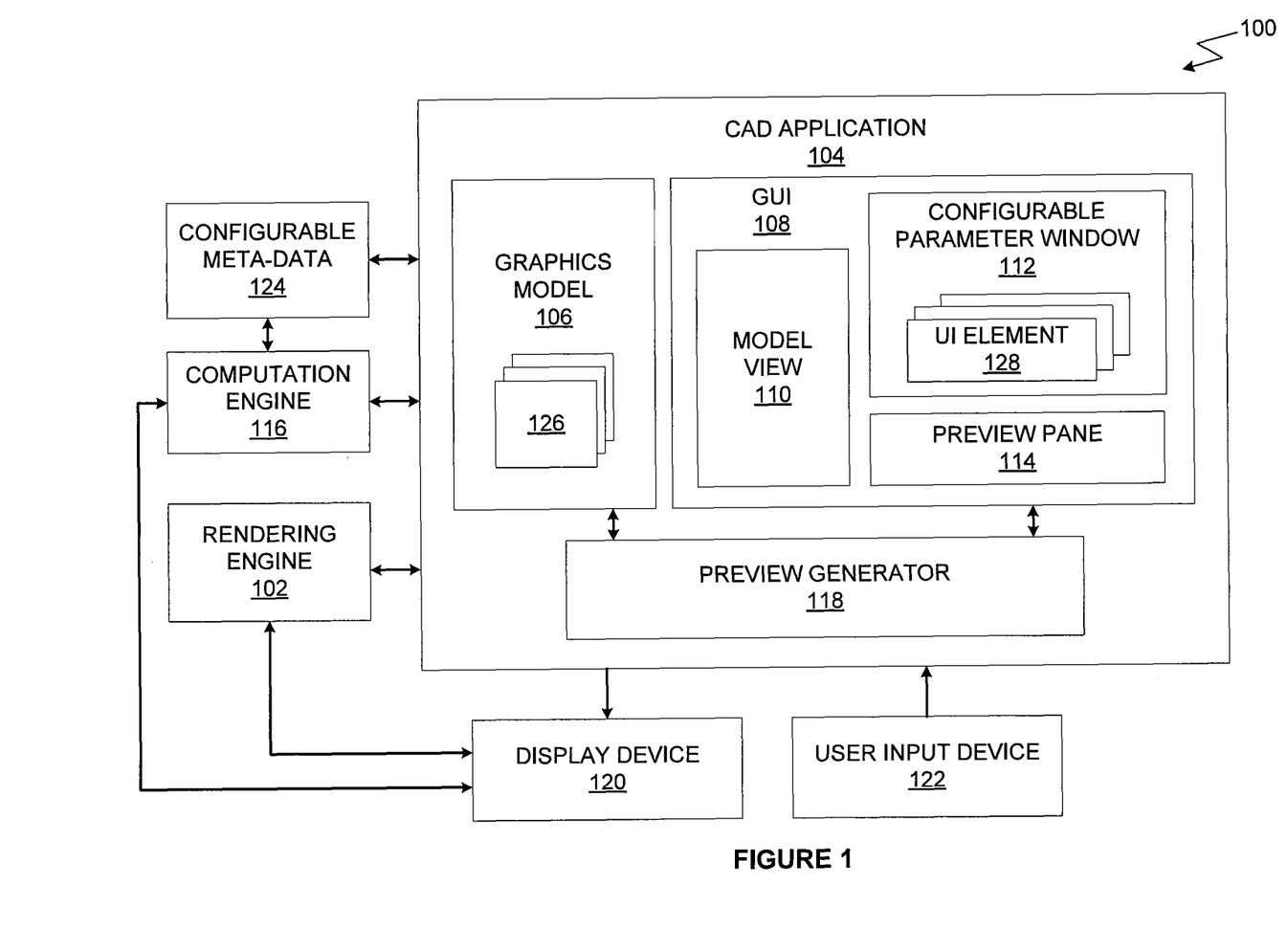
FIG. 1 is a block diagram of a system configured to implement one or more aspects of the invention.

FIG. 1 is a block diagram of a system 100 configured to implement one or more aspects of the invention. The components illustrated in FIG. 1 may include computer software applications executing on existing computer systems, e.g., desktop computers, server computers, laptop computers, tablet computers, video game consoles, and the like. The software applications described herein, however, are not limited to any particular computer system and may be adapted to take advantage of new computer systems as they become available.

Additionally, the components illustrated in FIG. 1 may be implemented as software applications that execute on a single computer system or on distributed systems communicating over computer networks such as local area networks or large, wide area networks, such as the Internet. For example, a graphical user-interface (GUI) 108 may include a software program executing on a client computer system at one physical location communicating with a graphics application 104 at another physical location. Also, in one embodiment, the graphics application 104 and the GUI 108 may be provided as an application program (or programs) stored on computer-readable storage media such as a CD-ROM, DVD-ROM, flash memory module, or other tangible storage media.

As shown, the system 100 includes, without limitation, a rendering engine 102, the graphics application 104, a computation engine 116, a display device 120, a user input device 122, and configurable meta-data 124. The rendering engine 102 is configured to allow users interacting with the GUI 108 via the user input device 122 to render a graphics scene and display the rendered images on the display device 120.

The graphics application 104 may be any type of graphics software application, including modeling applications, animation applications, rendering applications, computer-aided design graphics applications, pixel-based graphics applications, vector-based graphics applications, and the like. As shown, the graphics application 104 includes a graphics model 106, the GUI 108, and a preview generator 118. The graphics model 106 is a user-defined graphics model which includes one or more graphics objects 126. The graphics model may be a two-dimensional (2D) or a three-dimensional (3D) graphics model. An example of the graphics model 106 is a model of a building including graphics objects 126 such as walls, windows, light sources, etc. Each graphics object 126 may be associated with a specific object type and one or more physical and/or display characteristics. The one or more physical and/or display characteristics associated with a given graphics object 126 depend on the object type of the graphics object 126. For example, a wall graphics object in the graphics model 106 may be associated with a thickness physical characteristic, and a lighting graphics object in the graphics model 106 may be associated with a brightness physical characteristic.

Each physical and/or display characteristic associated with a given graphics object 126 is associated with at least one configurable parameter having a parameter value. The parameter value of a configurable parameter specifies the value of the associated physical and/or display characteristic of the graphics object 126. For example, the parameter value of a thickness configurable parameter specifies the value of the thickness of a wall graphics object in the graphics model 106. The parameter value of a brightness configurable parameter specifies the value of the brightness of a lighting graphics object in the graphics model 106.

The GUI 108 is configured to generate a model view 110, a configurable parameter window 112, and a preview pane 114. The GUI 108 is also configured to transmit the model view 110, the configurable parameter window 112, and the preview pane 114 to the display device 120 for display. The model view 110 is a rendered view of the graphics model 106 displayed on the display device 120. The configurable parameter window 112 includes one or more UI elements 128 corresponding to different configurable parameters. In one embodiment, when a user selects a given graphics object 126 using the user input device 122, the UI elements 128 corresponding to different configurable parameters associated with the physical and/or display characteristics of the graphics object 126 are displayed in the configurable parameter window 112. Some examples of UI elements 128 displayed in the configurable parameter window 112 include a slider bar, a drop-down box, a numerical input field, a rotation tool, etc. The user may manipulate a specific UI element 128 displayed in the configurable parameter window 112 using the user input device 122. The manipulation of the UI element 128 causes the modification of the parameter value of the configurable parameter corresponding to the UI element 128. Again, the parameter value of a configurable parameter specifies the value of a physical and/or display characteristic of a given graphics object 126. Therefore, a modification of the parameter value results in the change of the physical and/or display characteristic of the graphics object 126.

When the specific UI element 128 is manipulated, the graphics application 104 transmits a notification to the computation engine 116 that includes the modified parameter value and an object identifier associated with the currently selected graphics object 126. The computation engine 116 then computes the change in the physical and/or display characteristic of the selected graphics object 126 associated with the modified parameter value (herein referred to as the "result of the modified parameter value". ) The computation engine 116 also determines a set of additional parameter values for the configurable parameter corresponding to the UI element 128. The computation engine 116 determines the set of additional parameter values based on configurable meta-data 124 stored within the system 100. The configurable meta-data 124 may include information regarding the number of additional parameter values that should be determined by the computation engine 116. The configurable meta-data 124 may also include information regarding the use patterns of the specific user and/or the parallel processing capabilities of the system 100. The computation engine 116 processes the configurable meta-data 124 to determine the numerical value and the number of the additional parameter values. The configurable meta-data 124 may be configured by the user.

The computation engine 116 then computes the change in the physical and/or display characteristic of the selected graphics object 126 associated with each additional parameter value in the set of parameter values (herein referred to as the "results of each additional parameter value". ) For example, when the user modifies the thickness parameter value associated with a thickness configurable parameter of a wall graphics object, the computation engine 116 computes the result of the modified parameter value. In addition, the computation engine determines a set of additional thickness parameter values and computes results of each additional thickness parameter value. Each computed result specifies a different change in the thickness of the wall graphics object. In one embodiment, computing the results of each additional parameter value may be performed on hardware configured to compute the result of each additional parameter value in parallel. An example of such hardware is a graphics processing unit (GPU), an application-specific integrated circuit (ASIC), a field-programmable gate array (FPGA), or any other processing unit that is configured to execute instructions related to computing different results of each additional parameter value in parallel.

After the result of the modified parameter value and the results of each additional parameter value are computed, the computation engine 116 transmits all of the results to the preview generator 118 within the graphics application 104. The preview generator 118 generates a preview of the selected graphics object 126 incorporating the change in the physical and/or display characteristic of the selected graphics object 126 specified by the result of the modified parameter value. For each additional parameter value, the preview generator 118 also generates a preview of the selected graphics object 126 incorporating the change in the physical and/or display characteristic of the selected graphics object 126 specified by each result of the additional parameter value. The preview generator 118 then transmits each generated preview of the selected graphics object 126 to the preview pane 114 within the GUI 108 for display. In one embodiment, the preview pane 114 displays the previews based on the type of the configurable parameter value and the object type of the selected graphics object 126. The user may select a preview displayed on the preview pane 114 that best matches the desired change in the physical and/or display characteristic. The change in the physical and/or display characteristic associated with the selected preview is incorporated in the graphics model 106 and displayed on the model view 110.

The GUI 108 and the rendered output of the rendering engine 102 may be displayed to the user via the display device 120. The display device 120 may be a cathode-ray tube (CRT) or liquid crystal display (LCD) or any other type of display device. Input is received from the user via the user input device 122, which may be a mouse pointing device, a keyboard, a joystick, a video game controller, or any other type of user input device.

Figure 2:
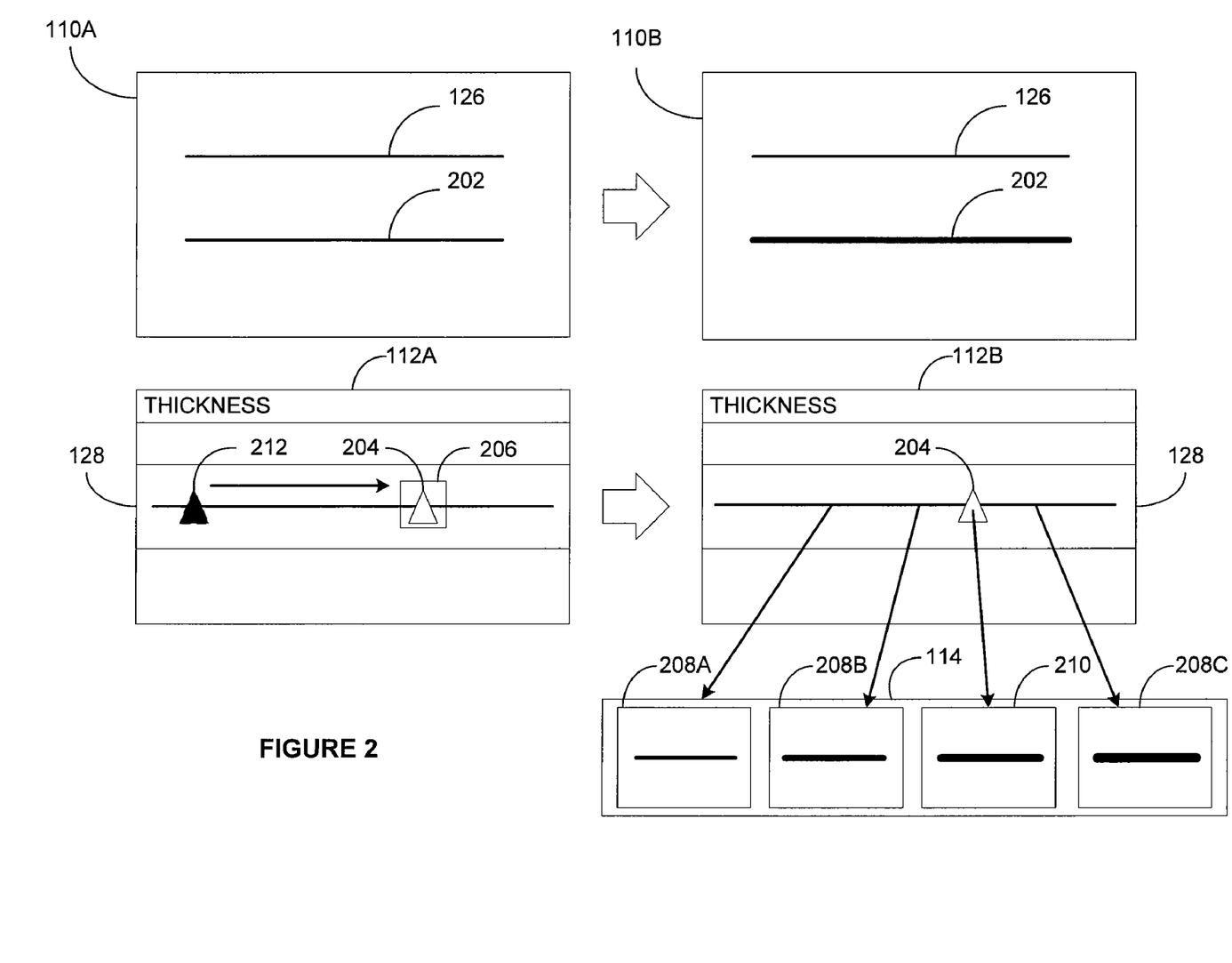
FIG. 2 is a conceptual diagram illustrating the previews of a selected graphics object displayed in a preview pane when a configurable parameter is modified, according to one embodiment of the invention.

FIG. 2 is a conceptual diagram illustrating the previews of a selected graphics object 202 displayed in the preview pane 114 when a configurable parameter is modified, according to one embodiment of the invention. As shown, a model view 110A includes a graphics object 126 and the selected graphics object 202, which is selected by a user using the user input device 122. In the example shown, the graphics object 126 and the selected graphics object 202 are line segments in a 2D graphics model. A configurable parameter window 112A includes a UI element 128 corresponding to the thickness configurable parameter associated with the selected graphics object 202. In this embodiment, the UI element 128 is a slider bar that includes a sliding component 204. The user may manipulate the UI element 128 by modifying the position of the sliding component via the user input device 122. Each position of the sliding component 204 corresponds to a specific parameter value of the thickness configurable parameter associated with the selected graphics object 202.

When the user manipulates the UI element 128 to modify the position of the sliding component 204 from a starting position 212 to a final position 206, the GUI 108 transmits a notification to the computation engine 116. As previously described in conjunction with FIG. 1, the notification transmitted to the computation engine 116 includes the modified parameter value corresponding to the final position 206 and an object identifier associated with the selected graphics object 202. In response to the notification, the computation engine 116 computes the result of the modified parameter value. The computation engine 116 determines a set of additional parameter values of the thickness configurable parameter corresponding to the UI element 128. The computation engine 116 then computes the results of each additional parameter value.

As described, the results of each additional parameter value may be computed in parallel. Each result specifies a different change in the thickness characteristic of the selected graphics object 202.

Once the result of the modified parameter value and the results of each additional parameter value are computed, the computation engine 116 transmits all of the results to the preview generator 118. The preview generator 118 generates a preview of the selected graphics object 202 incorporating the change in the thickness parameter of the selected graphics object 202 specified by the result of the modified parameter value. For each additional parameter value, the preview generator 118 generates a preview of the selected graphics object 202 incorporating the change in the thickness parameter of the selected graphics object 202 specified by the result of the additional parameter value. The preview generator 118 then transmits each preview to the preview pane 114 within the GUI 108 for display. As shown, the preview pane 114 includes previews of the selected graphics object 202, such as previews 208A-208C and preview 210. Each of the previews 208A-208C within the preview pane 114 includes a view of the selected graphics object 202 with a different thickness characteristic based on a different parameter value. In one embodiment, the preview 210 is generated based on the result of the modified parameter value and the previews 208A-208C are generated based on the results of each additional parameter value.

The user may select one of the previews 208A-208C or 210 that display results closest to a desired result. The selected graphics object 202 in the model view 110B is then updated based on the parameter value associated with the selected preview. However, if none of the previews displayed in the preview pane 114 matches the desired result, the user may re-modify the position of the sliding component 204 within the configurable parameter window 112B again. The modification of the position of the sliding component 204 causes the computation engine 116 to compute new results corresponding to the parameter value associated with the new position of the sliding component 204 and a new set of additional parameter values. The new set of additional parameters computed by the computation engine 116 are based on the parameter value associated with the previous position of the sliding component 204 and the new position of the sliding component 204. Importantly, with each iteration of modifying the position of the sliding component 204, the numerical values of the set of additional parameters become closer thereby allowing the user to hone in on a desired parameter value. The preview generator 118 then generates a new set of previews associated with the new results computed by the computation engine 116, which are then displayed within the preview pane 114.

Figure 3:
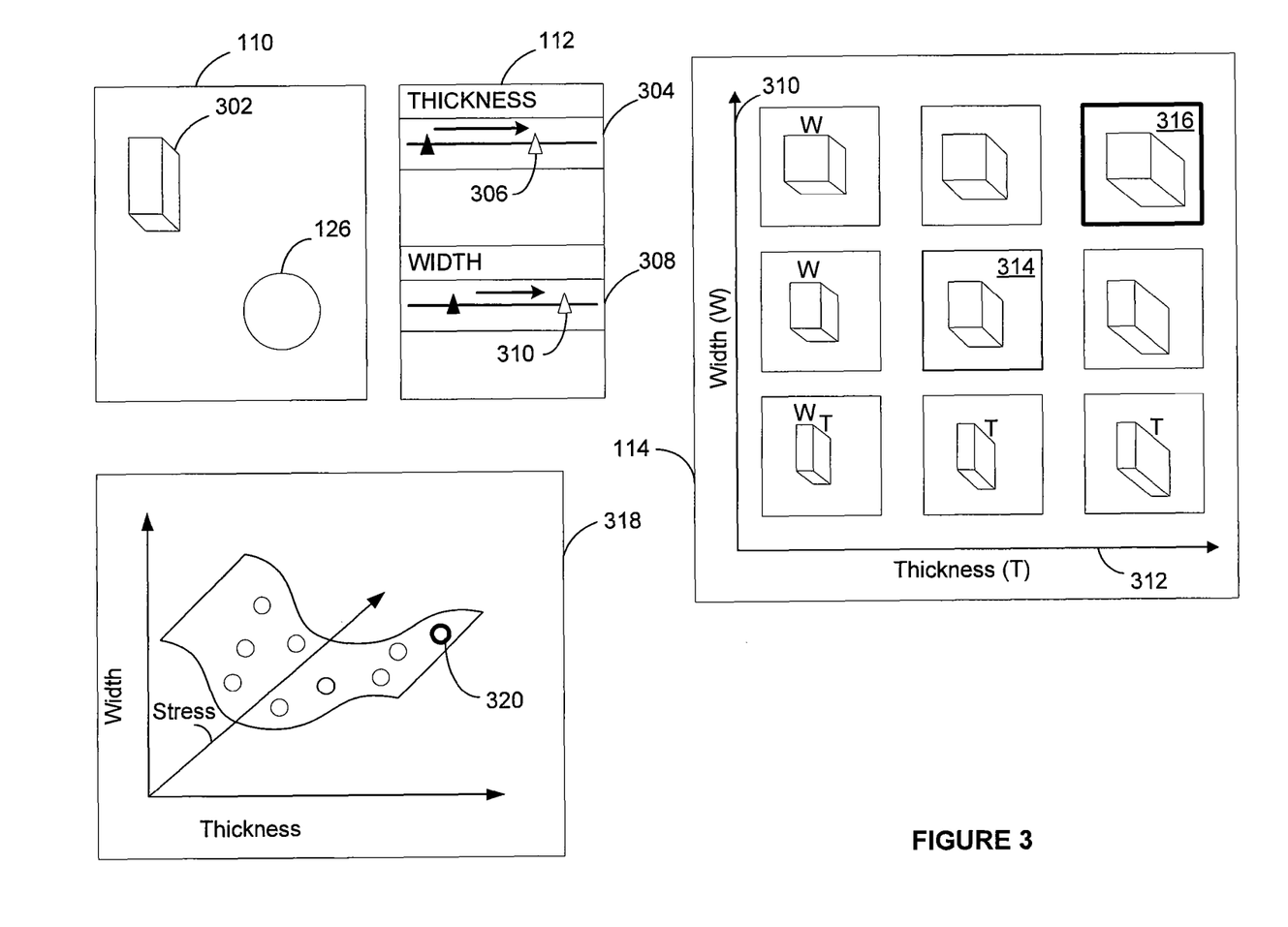
FIG. 3 is a conceptual diagram illustrating previews of a selected graphics object in the preview pane when two configurable parameters are modified, according to one embodiment of the invention.

FIG. 3 is a conceptual diagram illustrating previews of a selected graphics object 302 in the preview pane 114 when two configurable parameters are modified, according to one embodiment of the invention. As shown, the model view 110 includes a graphics object 126 and the selected graphics object 302, which is selected by a user using the user input device 122.

The configurable parameter window 112 includes a UI element 304 corresponding to a thickness configurable parameter associated with the selected graphics object 302. The UI element 304 includes a slider bar having a sliding component 306. The UI element 304 may be manipulated by the user, via the user input device 122, to modify the position of the sliding component 306. Each position of the sliding component 306 corresponds to a specific parameter value of the thickness configurable parameter associated with the selected graphics object 302. The configurable parameter window 112 also includes a UI element 308 corresponding to a width configurable parameter associated with the selected graphics object 302. The UI element 308 includes a slider bar having a sliding component 310. The UI element 308 may be manipulated by the user, via the user input device 122, to modify the position of the sliding component 310. Each position of the sliding component 310 corresponds to a specific parameter value of the configurable width parameter associated with the selected graphics object 302.

When the user manipulates the UI element 304 to modify the position of the sliding component 306 and/or manipulates the UI element 308 to modify the position of the sliding component 310, the GUI 108 transmits a notification to the computation engine 116. The notification transmitted to the computation engine 116 includes a modified thickness parameter value corresponding to the modified position of the sliding component 306 and/or a modified width parameter value corresponding to the modified position of the sliding component 310. The notification also includes an object identifier associated with the selected graphics object 302. In response to the notification, the computation engine 116 computes the result of the combination of the thickness modified parameter value and the width modified parameter value. The computation engine 116 determines a set of additional thickness parameter values of the thickness configurable parameter corresponding to the UI element 304. The computation engine 116 also determines a set of additional width parameter values of the configurable width parameter corresponding to the UI element 308. For each additional thickness parameter value, the computation engine 116 computes the results of the combination of the additional thickness parameter value and each additional width thickness parameter value (referred to herein as the "results of the additional width-thickness pairs".) Each result specifies a change in the thickness characteristic and/or the width characteristic of the selected graphics object 302. As described, the results of the width-thickness pairs may be computed in parallel.

The computation engine 116 then transmits the result of the combination of the thickness modified parameter value and the width modified parameter value and the results of the additional width-thickness pairs to the preview generator 118. The preview generator 118 generates a preview 314 of the selected graphics object 302 based on the result of the combination of the thickness modified parameter value and the width modified parameter value. For each result of the additional width-thickness pairs, the preview generator 118 generates a preview of the selected graphics object 302. Once such preview is preview 316. The preview generator 118 then transmits each preview to the preview pane 114 within the GUI 108 for display.

As shown, the preview pane 114 includes a width-axis (W-axis) 310, a thickness-axis (T-axis) 312, and previews of the selected graphics object 302, such as preview 314 and preview 316. The W-axis 310 corresponds to the width parameter values of the configurable width parameter associated with the selected graphics object 302. The T-axis 312 corresponds to the thickness parameter values of the configurable thickness parameter associated with the selected graphics object 302. In another embodiment, each of the W-axis 310 and T-axis 312 may correspond to more than one configurable parameter associated with the selected graphics object 302. Each preview within the preview pane 114 includes a view of the selected graphics object 302 with a different combination of the thickness characteristic and the width characteristic based on a different combination of the thickness parameter value and the width parameter value. For example, the preview 314 is based on the result of the combination of the modified thickness parameter value and the modified width parameter value. The location of each specific preview within the preview pane 114 is based on the thickness parameter value and the width parameter value associated with the preview.

In one embodiment, an analysis is performed on each result of the width-thickness pairs to compute a third variable, such as stress. The results of the analysis may be displayed in a 3D graph, such as 3D graph 318. Data points in the 3D graph 318, such as data point 320, correspond to different previews in the preview pane 114 plotted along a stress axis. For example, data point 320 may correspond to preview 316. In one embodiment, the user may change a particular width-thickness pair for the selected graphics object 302 based on the value of the third variable (e.g., stress) associated with the particular width-thickness pair. The width and thickness parameters associated with the selected graphics object 302 may then be modified to correspond to the width and thickness values of the particular width-thickness pair.

Figure 4:
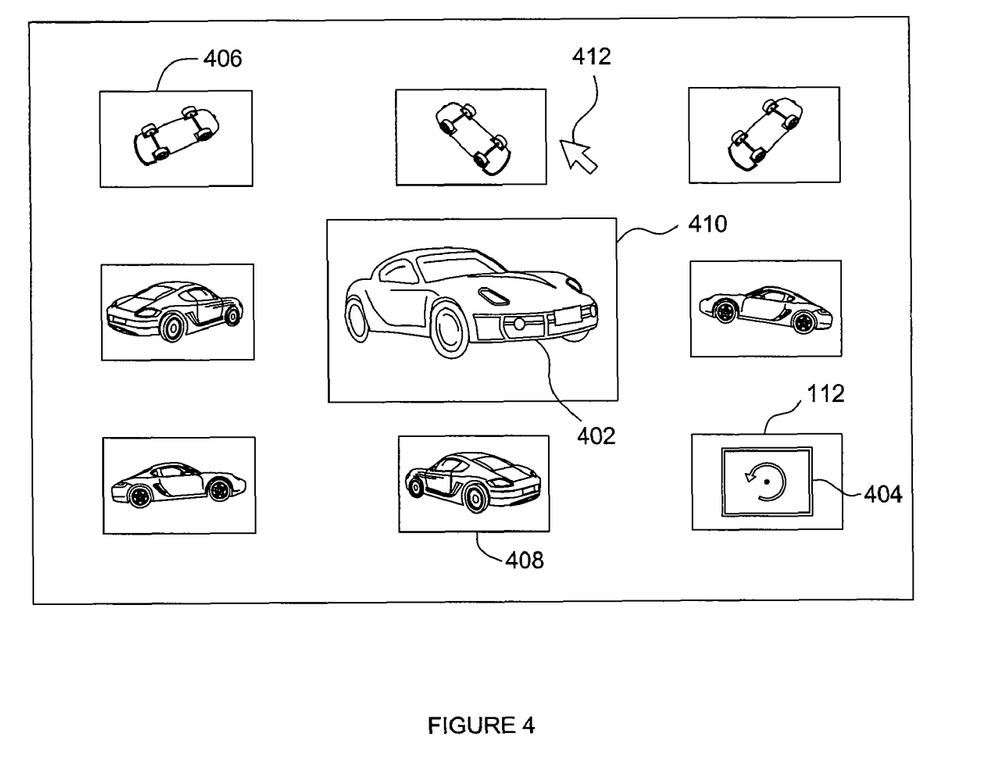
FIG. 4 is a conceptual diagram illustrating previews of the graphics object generated before a configurable parameter is modified, according to one embodiment of the invention.

FIG. 4 is a conceptual diagram illustrating previews of the graphics object 402 generated before a configurable parameter is modified, according to one embodiment of the invention. As shown, the model view 410 includes a graphics object 402. As also shown, the configurable parameter window 112 includes a UI element 404 corresponding to a rotation configurable parameter associated with the graphics object 402. When the user selects the UI element 404, the user may move the mouse cursor 412, using the input device 122, within the GPU 108 to cause the graphics object 402 to rotate.

Also upon the selection of the UI element 404, the preview generator 118 generates previews, such as preview 406 and preview 408, of the graphics object 402. Each preview generated by the preview generator 118 is associated with a different parameter value of the rotation configurable parameter. The placement of each preview displayed on the GUI 108 is determined based on the parameter value associated with the preview. The user may also move the mouse cursor 412 to a particular preview to select that preview. The rotation configurable parameter associated with the graphics object 402 is then updated based on the parameter value associated with the selected preview. For example, if the user moves the mouse cursor 412 to preview 406, the parameter value of the rotation configurable parameter associated with the graphics object 402 is updated based on the parameter value associated with preview 406.

Figure 5A:
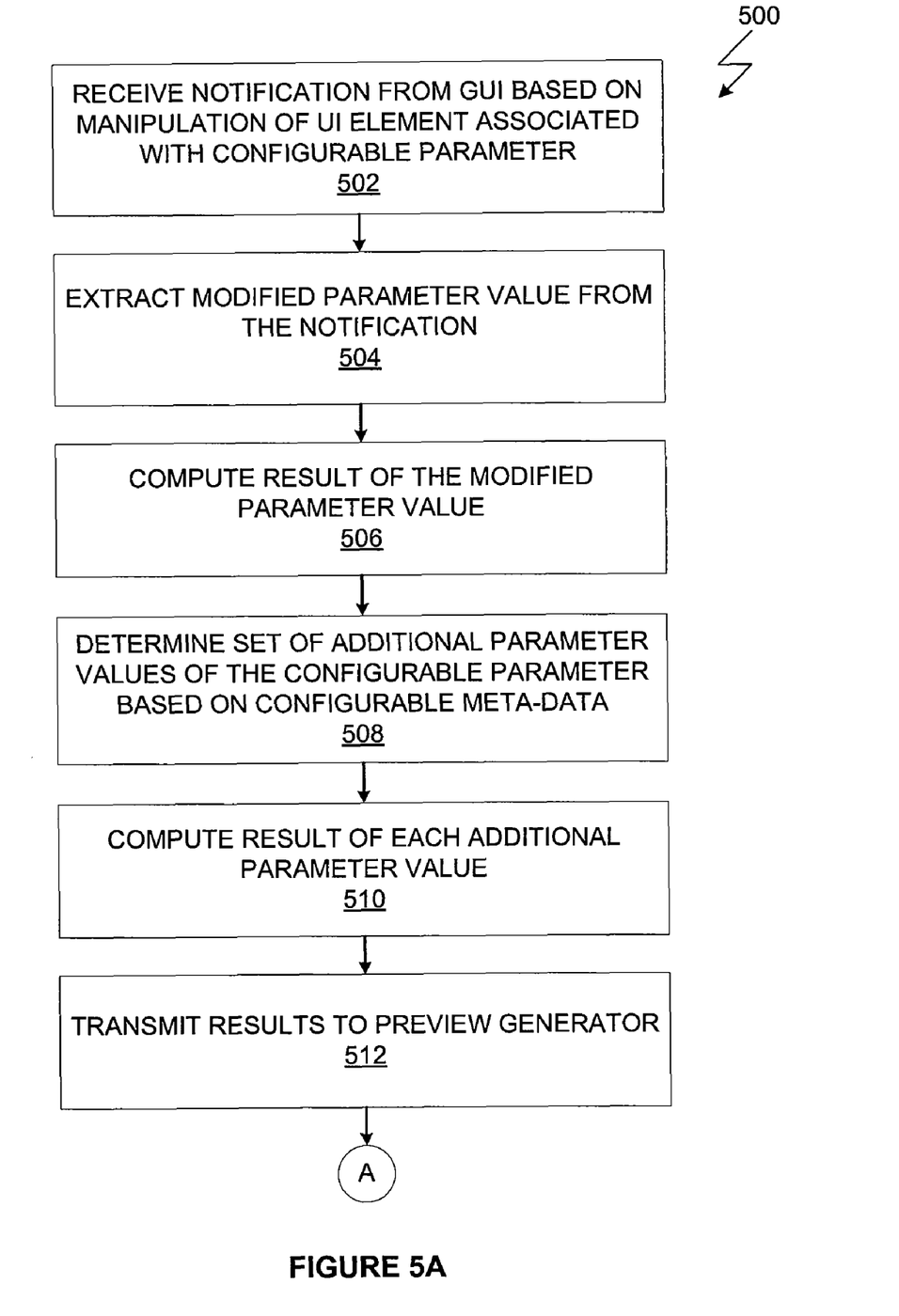
FIGS. 5A and 5B set forth a flow diagram of method steps for generating and displaying previews of a graphics object based on a modified parameter value of a configurable parameter, according to one embodiment of the invention.
Figure 5B:
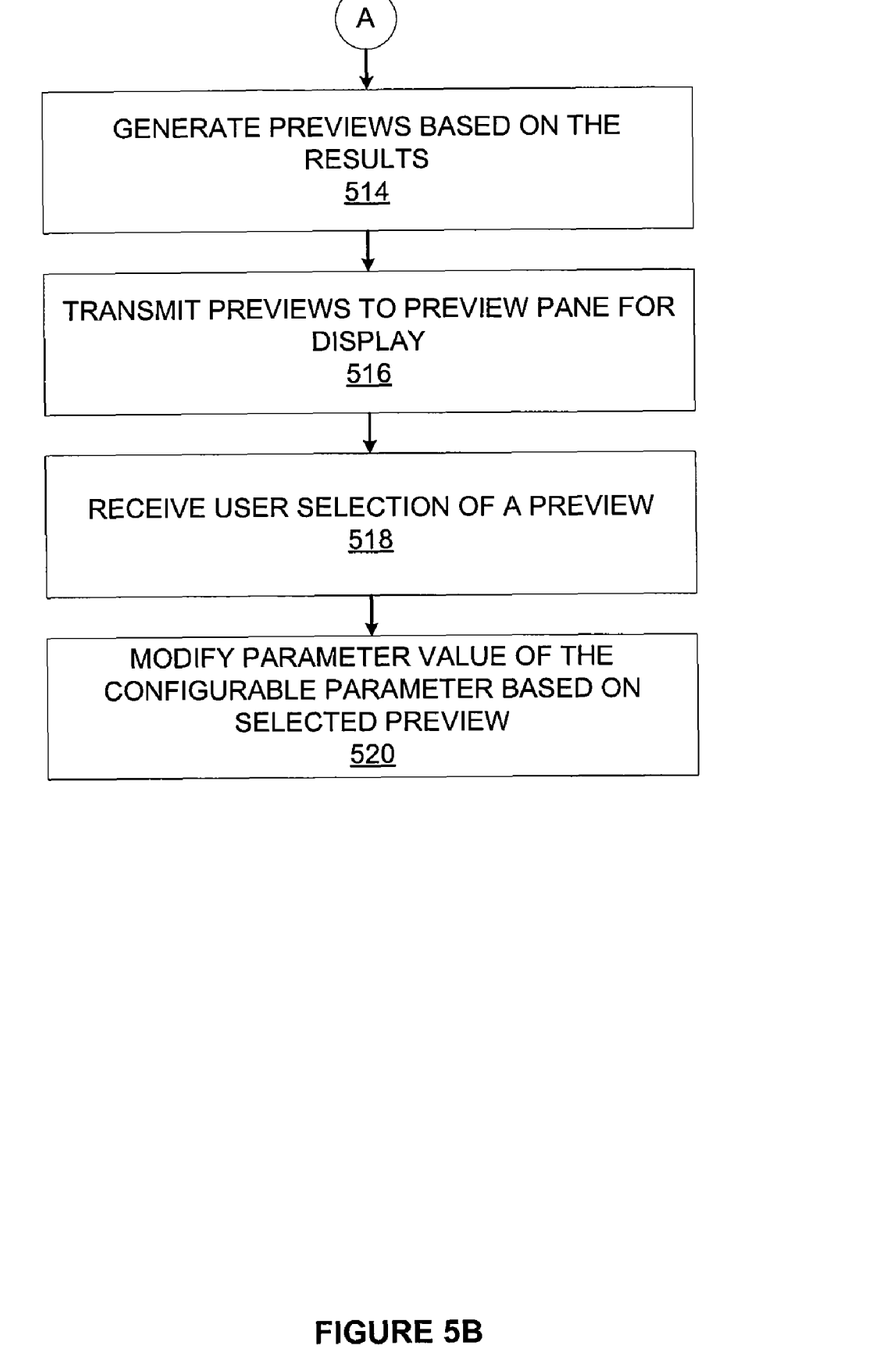

FIGS. 5A and 5B set forth a flow diagram of method steps for generating and displaying previews of a graphics object based on a modified parameter value of a configurable parameter, according to one embodiment of the invention. Although the method steps are described in conjunction with the systems for FIGS. 1-4, persons skilled in the art will understand that any system configured to perform the method steps, in any order, is within the scope of the invention.

The method 500 begins at step 502, where the computation engine 116 receives a notification from the GUI 108. As described above, the GUI 108 transmits a notification to the computation engine 116 when a UI element 128 corresponding to a configurable parameter associated with a graphics object 126 is manipulated. The notification includes an object identifier associated with the graphics object 126 and the modified parameter value. At step 504, the computation engine 116 extracts the modified parameter value from the notification received from the GUI 108. At step 506, the computation engine 116 computes the result of the modified parameter value. As previously described, the result of the modified parameter value specifies a change in the physical and/or display characteristic of the graphics object 126 associated with the configurable parameter.

At step 508, the computation engine 116 determines a set of additional parameter values of the configurable parameter based on configurable meta-data 124. The configurable meta-data 124 may include information such as the number of additional parameter values that should be determined. At step 510, the computation engine 116 computes one or more results of each additional parameter value in the set of additional parameter values. At step 512, the computation engine 116 transmits the results of the modified parameter value and the one or more results of each additional parameter value to the preview generator 118. At step 514, the preview generator 118 generates a different preview of the graphics object 126 for the result of the modified parameter value and the one or more results of each additional parameter value received from the computation engine 116. At step 516, the preview generator 118 transmits the generated previews to the preview pane 114 in the GUI 108 for display.

At step 518, the user selects a preview displayed in the preview pane 114 that best matches the desired change in the physical and/or display characteristic of the graphics object 126. The preview selected by the user may be a preview associated with the modified parameter value or an additional parameter value in the set of additional parameter values. At step 520, the parameter value of the configurable parameter associated with the graphics object 126 is updated based on the parameter value associated with the selected preview. The graphics object 126 within the model view 110 displays the change in the physical and/or display characteristic associated with the updated parameter value.

Figure 6:
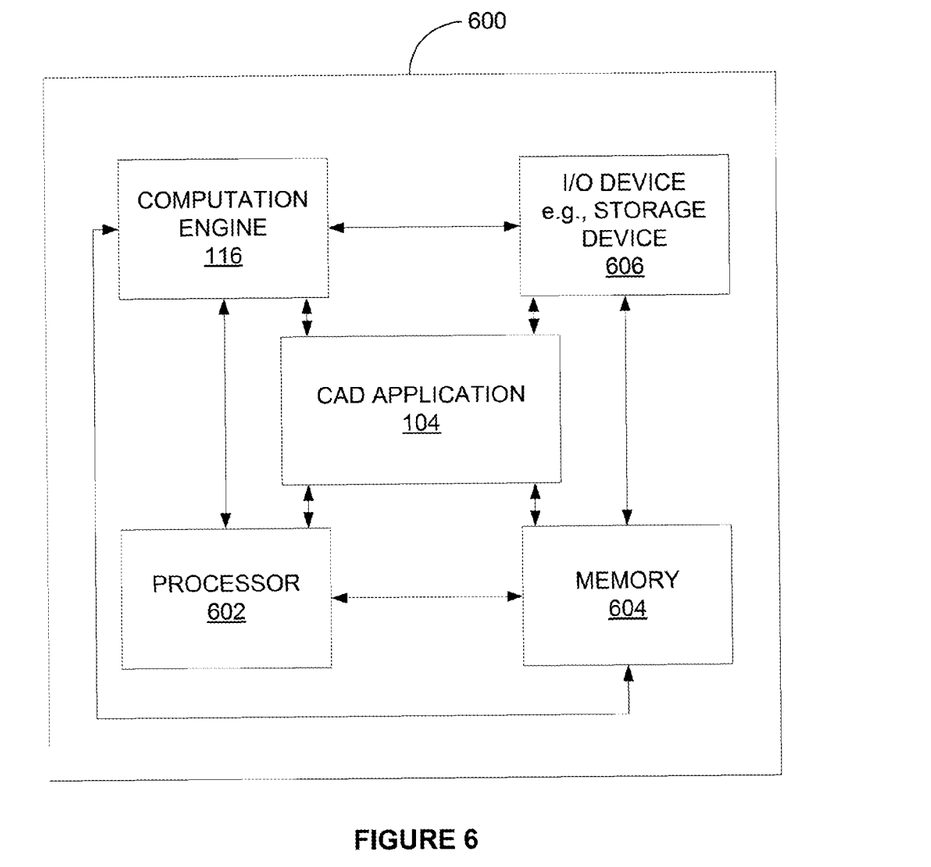
FIG. 6 illustrates a high level block diagram of a general purpose computer configured to implement one or more aspects of the invention.

FIG. 6 illustrates a high level block diagram of a general purpose computer configured to implement one or more aspects of the invention. As shown, system 600 includes a processor element 602 (e.g., a CPU), a memory 604, e.g., random access memory (RAM) and/or read only memory (ROM), a graphics application 104, and various input/output devices 606, which may include storage devices, including but not limited to, a tape drive, a floppy drive, a hard disk drive or a compact disk drive, a receiver, a transmitter, a speaker, a display, a speech synthesizer, an output port, and a user input device such as a keyboard, a keypad, a mouse, and the like.

In one embodiment, the processor element 602 is a parallel processing engine that is configured to efficiently compute the result of each additional parameter value in parallel. An example of such hardware is a multi-core central processing unit (CPU), a graphics processing unit (GPU), an application-specific integrated circuit (ASIC), a field-programmable gate array (FPGA), or any other processing unit that is configured to execute instructions related to computing different results of each additional parameter value in parallel.

In one embodiment, the graphics application 104 may transmit notifications to the computation engine 116 directly. In a different embodiment, the graphics application 104 may transmit notifications to the computation engine 116 via a software driver executing within the processor element 602.

In sum, a 2D model or 3D model defined in a graphics application includes one or more graphics objects that have physical and/or display characteristics. Each physical and/or display characteristic of a specific graphics object may be changed by modifying a parameter value of a configurable parameter associated with the characteristic. A computation engine computes the result of the modified parameter value. In addition, the computation engine determines a set of additional parameter values based on configurable meta-data. The configurable meta-data may include information such as the number of additional parameter values that should be determined. The computation engine then computes result of each additional thickness parameter value. Each computed result specifies a different change in the characteristic of the graphics object. As described, the results of each additional parameter value may be computed by the computation engine in parallel.

The computation engine transmits the computed results to a preview generator, also included in the graphics application. For each computed result, the preview generator generates a preview of the graphics object that incorporates the change in the characteristic of the graphics object. The previews are then transmitted to a GUI and displayed in a preview pane. The preview pane may be configured to display the previews differently based on the types and the number of adjusted configurable parameters. For example, when two or more configurable parameters may be modified, the previews are displayed in a two-dimensional grid fashion in the preview pane.

A preview displayed in the preview pane that best matches the desired change in the physical characteristic of the graphics object may be selected by the user. The change in the physical characteristic associated with the selected preview may then be included in the 2D or 3D model.

One advantage of the techniques disclosed herein is that a user is able to view the results of a set of additional parameter values of a configurable parameter along with the result of a user-selected parameter value. Because the user is able to select the result that best-matches a desired result, the user is able to reduce the number of iterations of modifying the parameter value needed to achieve the desired result.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for modifying a parameter value corresponding to a parameter associated with a graphics object included a graphics application, the method comprising:
    receiving a first user input to modify a first parameter value corresponding to a first parameter associated with the graphics object from a first value to a second value;

determining a first set of additional parameter values corresponding to the first parameter based on the second value and meta-data associated with the graphics application;

generating a first version of the graphics object based on setting the first parameter value to the second value;

generating a first set of one or more additional versions of the graphics object based on setting the first parameter value to each of the parameter values included in the first set of additional parameter values;

displaying the first version of the graphics object and the first set of one or more additional versions of the graphics object in a preview pane of a graphical user interface (GUI);

receiving a first user selection of either the first version of the graphics object or one of the additional versions of the graphics object from the first set of one or more additional versions; and rendering the graphics object in a model view pane of the GUI so that the first parameter value equals the parameter value associated with the selected version of the graphics object associated with the first user selection.

2. The method of claim 1, wherein generating each of the first set of one or more additional versions is performed in parallel on dedicated parallel processing hardware.

3. The method of claim 1, wherein the step of displaying includes:

displaying the first version and the first set of one or more additional versions in a preview pane on a display device; and displaying, for each version, an indicator corresponding to the parameter value associated with the version.

4. The method of claim 1, wherein the meta-data includes information related to the number of additional parameter values included in the first set of additional parameter values.

5. The method of claim 4, wherein the meta-data further includes information related to usage patterns associated with the graphics application.

6. The method of claim 1, further comprising the step of receiving a second user input to modify a second parameter value corresponding to a second parameter associated with the graphics object from a third value to a fourth value.

7. The method of claim 6, further comprising the steps of:

determining a second set of additional parameter values corresponding to the second parameter based on the fourth value and the meta-data associated with the graphics application;

generating a second version of the graphics object based on setting the first parameter value to the second value and setting the second parameter value to the fourth value;

generating one or more two-parameter versions for the graphics object based associating each of the values included in the first set of additional parameter values with each of the values included in the second set of additional parameter values; and displaying the second version and the one or more two-parameter versions in a grid, wherein a first axis of the grid corresponds to the first parameter and a second axis of the grid corresponds to the second parameter.

8. The method of claim 1, further comprising the steps of:

receiving a second user input to modify the first parameter value corresponding to the first parameter associated with the graphics object from the second value to a third value;

determining a second set of additional parameter values corresponding to the first parameter based on the third value and meta-data associated with the graphics application;

generating a second set of one or more additional versions of the graphics object based on setting the first parameter value to each of the parameter values included in the second set of additional parameter values;

displaying the first version of the graphics object and the second set of the one or more additional versions of the graphics object in the preview pane of the GUI;

receiving a second user selection of either the first version of the graphics object or one of the additional versions of the graphics object from the second set of one or more additional versions; and rendering the graphics object in the model view pane of the GUI so that the first parameter value equals the parameter value associated with the selected version of the graphics object associated with the second user selection.

9. A tangible computer-readable storage medium storing instruction that, when executed by a processor, cause a computing system to modify a parameter value corresponding to a parameter associated with a graphics object included a graphics application, by performing the steps of:

receiving a first user input to modify of a first parameter value corresponding to a first parameter associated with the graphics object from a first value to a second value;

determining a first set of additional parameter values corresponding to the first parameter based on the second value and meta-data associated with the graphics application;

generating a first version of the graphics object based on setting the first parameter value to the second value;

generating a first set of one or more additional versions of the graphics object based on setting the first parameter value to each of the parameter values included in the first set of additional parameter values;

displaying the first version of the graphics object and the first set of one or more additional versions of the graphics object in a preview pane of a graphical user interface (GUI);

receiving a first user selection of either the first version of the graphics object or one of the additional versions of the graphics object from the first set of one or more additional versions; and rendering the graphics object in a model view pane of the GUI so that the first parameter value equals the parameter value associated with the selected version of the graphics object associated with the first user selection.

10. The computer-readable storage medium of claim 9, wherein the step of displaying includes:

displaying the first version and the first set of one or more additional versions in a preview pane on a display device; and displaying, for each version, an indicator corresponding to the parameter value associated with the version.

11. The computer-readable storage medium of claim 9, wherein the meta-data includes information related to the number of additional parameter values included in the first set of additional parameter values.

12. The computer-readable storage medium of claim 11, wherein the meta-data further includes information related to usage patterns associated with the graphics application.

13. The computer-readable storage medium of claim 9, further comprising the step of receiving a second user input to modify a second parameter value corresponding to a second parameter associated with the graphics object from a third value to a fourth value.

14. The computer-readable storage medium of claim 13, further comprising the steps of:
   determining a second set of additional parameter values corresponding to the second parameter based on the fourth value and the meta-data associated with the graphics application;
   generating a second version of the graphics object based on setting the first parameter value to the second value and setting the second parameter value to the fourth value;
   generating one or more two-parameter versions for the graphics object based associating each of the values included in the first set of additional parameter values with each of the values included in the second set of additional parameter values; and
   displaying the second version and the one or more two-parameter versions in a grid, wherein a first axis of the grid corresponds to the first parameter and a second axis of the grid corresponds to the second parameter.

15. The computer-readable storage medium of claim 9, further comprising the steps of:
   receiving a second user input to modify the first parameter value corresponding to the first parameter associated with the graphics object from the second value to a third value;
   determining a second set of additional parameter values corresponding to the first parameter based on the third value and meta-data associated with the graphics application;
   generating a second set of one or more additional versions of the graphics object based on setting the first parameter value to each of the parameter values included in the second set of additional parameter values;
   displaying the first version of the graphics object and the second set of the one or more additional versions of the graphics object in the preview pane of the GUI;
   receiving a second user selection of either the first version of the graphics object or one of the additional versions of the graphics object from the second set of one or more additional versions; and
   rendering the graphics object in the model view pane of the GUI so that the first parameter value equals the parameter value associated with the selected version of the graphics object associated with the second user selection.

16. A computer system for modifying a parameter value corresponding to a parameter associated with a graphics object included a graphics application, the method comprising:
   a processor; and
   a memory storing instructions that when executed by the processor are configured to:
      receive a first user input to modify of a first parameter value corresponding to a first parameter associated with the graphics object from a first value to a second value,
      determine a first set of additional parameter values corresponding to the first parameter based on the second value and meta-data associated with the graphics application,
      generate a first version of the graphics object based on setting the first parameter value to the second value,
      generate a first set of one or more additional versions of the graphics object based on setting the first parameter value to each of the parameter values included in the first set of additional parameter values,
      display the first version of the graphics object and the first set of one or more additional versions of the graphics object in a preview pane of a graphical user interface (GUI),
      receive a first user selection of either the first version of the graphics object or one of the additional versions of the graphics object from the first set of one or more additional versions, and
      render the graphics object in a model view pane of the GUI so that the first parameter value equals the parameter value associated with the selected version of the graphics object associated with the first user selection.

17. The computer system of claim 16, further comprising a computation engine that is configured to generate each of the first set of one or more additional versions in parallel.

18. The computer system of claim 16, wherein displaying includes:
   displaying the first version and the a first set of one or more additional versions in a preview pane on a display device; and
   displaying, for each version, an indicator corresponding to the parameter value associated with the version.

19. The computer system of claim 16, wherein the meta-data includes information related to the number of additional parameter values included in the first set of additional parameter values.

20. The computer system of claim 19, wherein the meta-data further includes information related to usage patterns associated with the graphics application.

21. The computer system of claim 16, wherein the instructions are further configured to receive a second user input to modify a second parameter value corresponding to a second parameter associated with the graphics object from a third value to a fourth value.

22. The computer system of claim 21, wherein the instructions are further configured to:
   determine a second set of additional parameter values corresponding to the second parameter based on the fourth value and the meta-data associated with the graphics application;
   generate a second version of the graphics object based on setting the first parameter value to the second value and setting the second parameter value to the fourth value;
   generate one or more two-parameter versions for the graphics object based associating each of the values included in the first set of additional parameter values with each of the values included in the second set of additional parameter values; and
   display the second version and the one or more two-parameter versions in a grid, wherein a first axis of the grid corresponds to the first parameter and a second axis of the grid corresponds to the second parameter.

23. The computer system of claim 16, wherein the instructions are further configured to:
   receive a second user input to modify the first parameter value corresponding to the first parameter associated with the graphics object from the second value to a third value;
   determine a second set of additional parameter values corresponding to the first parameter based on the third value and meta-data associated with the graphics application;
   generate a second set of one or more additional versions of the graphics object based on setting the first parameter value to each of the parameter values included in the second set of additional parameter values;
display the first version of the graphics object and the second set of the one or more additional versions of the graphics object in the preview pane of the GUI;
receive a second user selection of either the first version of the graphics object or one of the additional versions of the graphics object from the second set of one or more additional versions; and render the graphics object in the model view pane of the GUI so that the first parameter value equals the parameter value associated with the selected version of the graphics object associated with the second user selection.

* * * * *